United States Patent
Baladhandapani et al.

(10) Patent No.: US 11,955,012 B2
(45) Date of Patent: Apr. 9, 2024

(54) TRANSCRIPTION SYSTEMS AND MESSAGE FUSION METHODS

(71) Applicant: HONEYWELL INTERNATIONAL INC., Charlotte, NC (US)

(72) Inventors: Gobinathan Baladhandapani, Madurai (IN); Hariharan Saptharishi, Madurai (IN); Sivakumar Kanagarajan, Bangalore (IN); Vengada Ganeshwaran, Bangalore (IN); Dineshkumar Atchuthan, Madurai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 224 days.

(21) Appl. No.: 17/459,675

(22) Filed: Aug. 27, 2021

(65) Prior Publication Data

US 2023/0010103 A1  Jan. 12, 2023

(30) Foreign Application Priority Data

Jul. 12, 2021 (IN) .............................. 202111031126

(51) Int. Cl.
*G08G 5/00* (2006.01)

(52) U.S. Cl.
CPC ......... *G08G 5/0004* (2013.01); *G08G 5/0021* (2013.01); *G08G 5/003* (2013.01); *G08G 5/0095* (2013.01)

(58) Field of Classification Search
CPC .... G08G 5/0004; G08G 5/0021; G08G 5/003; G08G 5/0095
See application file for complete search history.

(56) References Cited

U.S. PATENT DOCUMENTS

| 6,175,314 | B1 | 1/2001 | Cobley |
| 6,313,759 | B1 | 11/2001 | Musland-Sipper |
| 7,580,377 | B2 | 8/2009 | Judd |
| 8,666,748 | B2 | 3/2014 | Dong et al. |
| 9,263,039 | B2 | 2/2016 | Di Cristo et al. |

(Continued)

FOREIGN PATENT DOCUMENTS

DE   102005063077 B4   5/2011

*Primary Examiner* — James M McPherson
*Assistant Examiner* — Bakari Underwood
(74) *Attorney, Agent, or Firm* — Lorenz & Kopf LLP

(57) ABSTRACT

Methods and systems are provided for assisting operation of a vehicle using speech recognition and transcription to provide a conversation log graphical user interface (GUI) display that consolidates communications with respect to the vehicle. One method involves receiving a data message from a system onboard the vehicle and generating a graphical representation of the data message within the conversation log GUI display, wherein the graphical representation of the data message includes a selectable element and is displayed on the conversation log GUI display concurrently with a graphical representation of a transcription of an audio communication with respect to the vehicle. The depicted data message and transcription are chronologically positioned with respect to one another in accordance with a timestamp associated with the data message. The conversation log GUI display dynamically updates in response to selection of the selectable element.

20 Claims, 5 Drawing Sheets

(56) References Cited

U.S. PATENT DOCUMENTS

| | | |
|---|---|---|
| 9,293,050 B2 | 3/2016 | Judy |
| 9,666,178 B2 | 5/2017 | Loubiere |
| 9,792,896 B2 | 10/2017 | Lample et al. |
| 10,543,931 B2 | 1/2020 | Saptharishi et al. |
| 10,887,255 B2 | 1/2021 | Thompson |
| 2004/0124998 A1 | 7/2004 | Dame |
| 2007/0189328 A1 | 8/2007 | Judd |
| 2009/0089693 A1 | 4/2009 | Fahy |
| 2010/0268534 A1 | 10/2010 | Kishan Thambiratnam et al. |
| 2014/0253585 A1* | 9/2014 | Paul Dominic ...... G08G 5/0021 701/14 |
| 2015/0212701 A1 | 7/2015 | Rodney et al. |
| 2016/0202950 A1 | 7/2016 | Hawley |
| 2017/0039858 A1 | 2/2017 | Wang et al. |
| 2017/0124734 A1 | 5/2017 | Gowda |
| 2018/0129635 A1* | 5/2018 | Saptharishi ............ B64D 43/00 |
| 2018/0268718 A1 | 9/2018 | Srivastav et al. |
| 2020/0322290 A1 | 10/2020 | Thompson |
| 2020/0372916 A1* | 11/2020 | Delpech ............... G08G 5/0013 |
| 2020/0380958 A1 | 12/2020 | Srinivasan et al. |

\* cited by examiner

TRANSCRIPTION SYSTEMS AND MESSAGE FUSION METHODS

CROSS REFERENCE TO RELATED APPLICATION

This application claims priority to India Provisional Patent Application No. 202111031126, filed Jul. 12, 2021, the entire content of which is incorporated by reference herein.

TECHNICAL FIELD

The subject matter described herein relates generally to vehicle systems, and more particularly, embodiments of the subject matter relate to avionics systems and methods for consolidating communications from different onboard sources.

BACKGROUND

Air traffic control typically involves voice communications between air traffic control and a pilot or crewmember onboard the various aircrafts within a controlled airspace. For example, an air traffic controller (ATC) may communicate an instruction or a request for pilot action by a particular aircraft using a call sign assigned to that aircraft. A pilot or crewmember onboard that aircraft subsequently acknowledges the request (e.g., by reading back the received information) in a separate communication that also includes the call sign. As a result, the ATC can determine that the correct aircraft has acknowledged the request, that the request was correctly understood, what the pilot intends to do, etc. Unfortunately, there are numerous factors that can complicate clearance communications, or otherwise result in a misinterpretation of a clearance communication, such as, for example, the volume of traffic in the airspace, similarities between call signs of different aircrafts in the airspace, congestion or interference on the communications channel being utilized, and/or human fallibilities (e.g., inexperience, hearing difficulties, memory lapse, language barriers, distractions, fatigue, etc.).

In addition to audio communications with ATC, aircraft may also receive alerts, advisories, notices, instructions or other clearance communications from various other sources, such as, for example, a controller-pilot datalink (CPDLC) system, an automatic terminal information service (ATIS), an aircraft communications addressing and reporting system (ACARS), and the like. Thus, when a pilot attempts to brief or review received communications, the pilot is often required to manually locate and obtain the desired information from different sources onboard the aircraft, and then either jot down or mentally retain and synthesize the information to obtain a comprehensive understanding of the current situation. Accordingly, it is desirable to provide aircraft systems and methods that reduce head-down time and facilitate a pilot maintaining situational awareness and adhering to clearances, instructions or other communications from various onboard sources to improve safety and efficiency of operation. Other desirable features and characteristics of the methods and systems will become apparent from the subsequent detailed description and the appended claims, taken in conjunction with the accompanying drawings and the preceding background.

BRIEF SUMMARY

Methods and systems are provided for assisting operation of a vehicle, such as an aircraft, using speech recognition and transcription. One method involves obtaining a transcription of an audio communication with respect to the vehicle, generating a conversation log graphical user interface (GUI) display including a graphical representation of the transcription of the audio communication, receiving a data message from a system onboard the vehicle, and generating a graphical representation of the data message within the conversation log GUI display. The graphical representation of the data message includes a selectable element associated with the data message, and the graphical representation of the data message and the graphical representation of the transcription of the audio communication are concurrently displayed on the conversation log GUI display. The graphical representation of the data message is also positioned with respect to the graphical representation of the transcription of the audio communication in accordance with a timestamp associated with the data message. The method dynamically updates the conversation log GUI display in response to selection of the selectable element.

In another embodiment, a computer-readable medium having computer-executable instructions stored thereon is provided. The computer-executable instructions, when executed by a processing system, cause the processing system to obtain a transcription of an audio communication with respect to a vehicle, generate a conversation log graphical user interface (GUI) display including a graphical representation of the transcription of the audio communication, receive a data message from a system onboard the vehicle and generate a graphical representation of the data message within the conversation log GUI display. The graphical representation of the data message includes a selectable element associated with the data message and the graphical representation of the data message and the graphical representation of the transcription of the audio communication are concurrently displayed on the conversation log GUI display, with the graphical representation of the data message being positioned with respect to the graphical representation of the transcription of the audio communication in accordance with a timestamp associated with the data message. The computer-executable instructions cause the processing system to dynamically update the conversation log GUI display in response to selection of the selectable element.

In another embodiment, a system is provided that includes a display device, a data storage element to maintain a transcription of an audio communication with respect to a vehicle, and a processing system coupled to the display device and the data storage element. The processing system is configurable to generate, on the display device, a conversation log graphical user interface (GUI) display including a graphical representation of the transcription of the audio communication, receive a data message from a system onboard the vehicle, generate a graphical representation of the data message within the conversation log GUI display that includes a selectable graphical user interface element associated with the data message, and dynamically update the conversation log GUI display in response to selection of the selectable graphical user interface element associated with the data message. The graphical representation of the data message and the graphical representation of the transcription of the audio communication are concurrently displayed on the conversation log GUI display, and the graphical representation of the data message is positioned with respect to the graphical representation of the transcription of the audio communication in accordance with a timestamp associated with the data message.

This summary is provided to describe select concepts in a simplified form that are further described in the detailed description. This summary is not intended to identify key or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
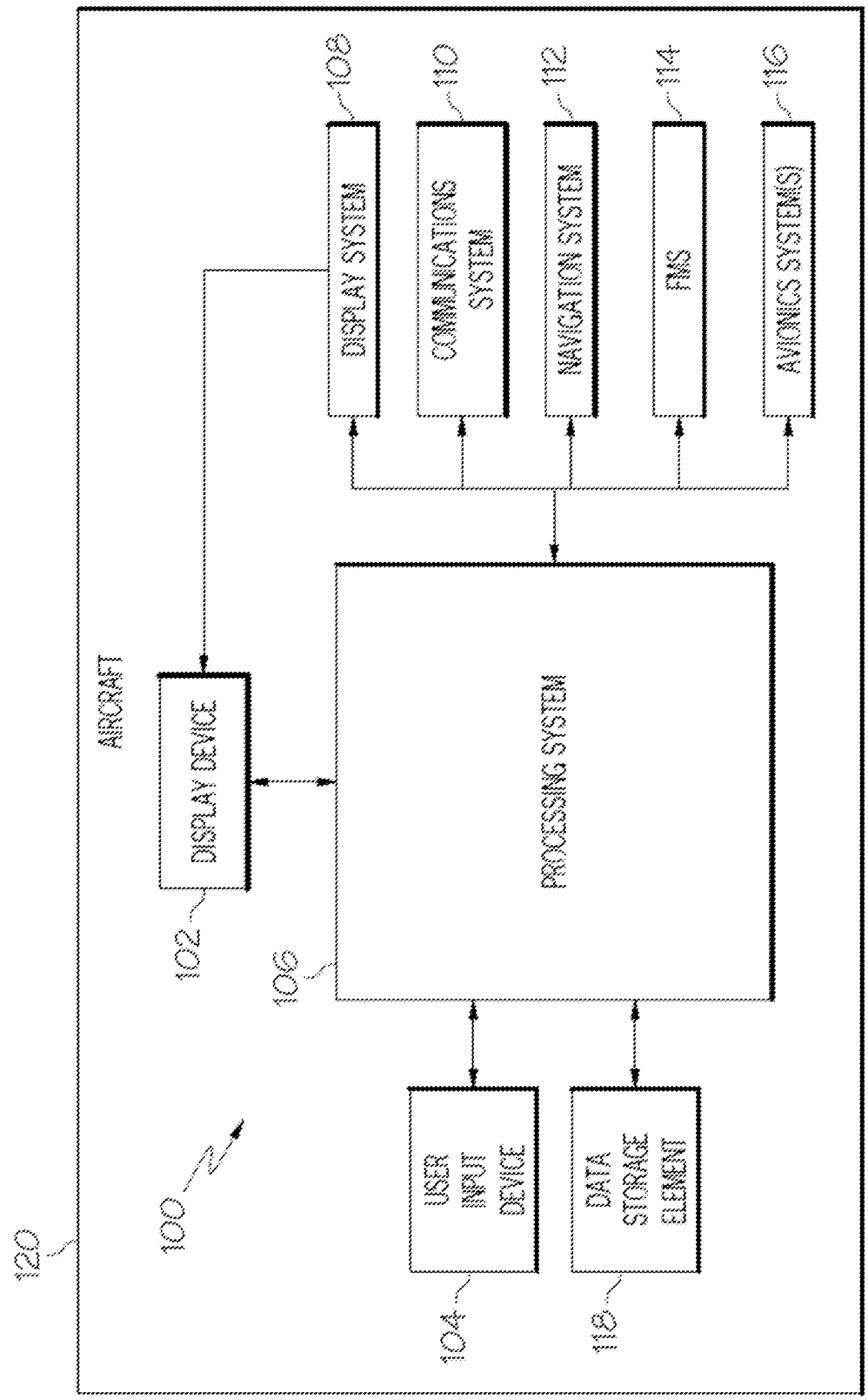
FIG. 1 is a block diagram illustrating a system suitable for use with a vehicle such as an aircraft in accordance with one or more exemplary embodiments.

The following detailed description is merely exemplary in nature and is not intended to limit the subject matter of the application and uses thereof. Furthermore, there is no intention to be bound by any theory presented in the preceding background, brief summary, or the following detailed description.

Embodiments of the subject matter described herein generally relate to systems and methods for consolidating presentation of clearance communications and/or other audio communications associated with a vehicle with text messages or other data messages (e.g., an image or the like) received via one or more onboard systems on a common display. By consolidating different types of communications from different sources on a common display, head-down time may be reduced and situational awareness improved by enabling a vehicle operator to more quickly review or brief the aggregated information in one place, rather than having to locate and consult different displays, systems or components onboard the vehicle. For purposes of explanation, the subject matter is primarily described herein in the context of aircraft operating in a controlled airspace; however, the subject matter described herein is not necessarily limited to aircraft or avionic environments, and in alternative embodiments, may be implemented in an equivalent manner for ground operations, marine operations, or otherwise in the context of other types of vehicles and travel spaces.

As described in greater detail below primarily in the context of FIGS. 2-5, audio communications received at the aircraft are transcribed and the corresponding textual representation of the transcribed audio communications is graphically presented on a conversation log graphical user interface (GUI) display that includes graphical representations of the transcribed audio communications arranged in a sequential manner in accordance with the timestamps associated with the respective audio communications. When a text message or other data message intended for the ownship aircraft is received, the conversation log GUI display is updated to include a graphical representation of the received message that is arranged with respect to the transcribed audio communications in a sequential manner in accordance with the timestamp associated with the received message relative to the timestamps associated with the transcribed audio communications. For example, a graphical representation of a controller-pilot datalink communications (CPDLC) message or similar avionics message (e.g., in ARINC 702 format or other closed loop messages between authorized users using a standard avionics protocol) may be interspersed between graphical representations of transcribed ATC clearance communications to allow a pilot, co-pilot or other crew member to concurrently review ATC clearance communications and CPDLC messages that are concurrently displayed and arranged in a sequential manner with respect to one another on a common display. While the subject matter may be described herein primarily in the context of an aviation-specific data message type or format, such as a CPDLC message, it should be appreciated that the subject matter is not limited to any particular type or format of data message and may be implemented in an equivalent manner for any sort of data message format or messaging service (e.g., short message service (SMS)).

In exemplary embodiments, the conversation log GUI display also includes one or more selectable GUI elements associated with the depicted message that allow the pilot, co-pilot or other crew member to initiate or otherwise perform one or more actions with respect to the message, such as, for example, accepting a request, acknowledging a request, rejecting a request, marking the message as read, deleting the message, and/or the like. In response to user selection of the selectable GUI element, the graphical representation of the message on the conversation log GUI display is dynamically updated to reflect the selected action by the pilot (e.g., by removing the selectable GUI element (s), changing a color or other visually distinguishable graphical characteristic associated with the depicted message, removing the message from the conversation log, and/or the like).

FIG. 1 depicts an exemplary embodiment of a system 100 which may be utilized with a vehicle, such as an aircraft 120. In an exemplary embodiment, the system 100 includes, without limitation, a display device 102, one or more user input devices 104, a processing system 106, a display system 108, a communications system 110, a navigation system 112, a flight management system (FMS) 114, one or more avionics systems 116, and a data storage element 118 suitably configured to support operation of the system 100, as described in greater detail below.

In exemplary embodiments, the display device 102 is realized as an electronic display capable of graphically displaying flight information or other data associated with operation of the aircraft 120 under control of the display system 108 and/or processing system 106. In this regard, the display device 102 is coupled to the display system 108 and the processing system 106, and the processing system 106 and the display system 108 are cooperatively configured to display, render, or otherwise convey one or more graphical representations or images associated with operation of the aircraft 120 on the display device 102. The user input device 104 is coupled to the processing system 106, and the user input device 104 and the processing system 106 are cooperatively configured to allow a user (e.g., a pilot, co-pilot, or crew member) to interact with the display device 102 and/or other elements of the system 100, as described in greater detail below. Depending on the embodiment, the user input device(s) 104 may be realized as a keypad, touchpad, keyboard, mouse, touch panel (or touchscreen), joystick, knob, line select key or another suitable device adapted to receive input from a user. In some exemplary embodiments, the user input device 104 includes or is realized as an audio input device, such as a microphone, audio transducer, audio sensor, or the like, that is adapted to allow a user to provide audio input to the system 100 in a "hands free" manner using speech recognition.

The processing system 106 generally represents the hardware, software, and/or firmware components configured to facilitate communications and/or interaction between the elements of the system 100 and perform additional tasks and/or functions to support operation of the system 100, as described in greater detail below. Depending on the embodiment, the processing system 106 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 106 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 106 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 106, or in any practical combination thereof. For example, in one or more embodiments, the processing system 106 includes or otherwise accesses a data storage element (or memory), which may be realized as any sort of non-transitory short or long term storage media capable of storing programming instructions for execution by the processing system 106. The code or other computer-executable programming instructions, when read and executed by the processing system 106, cause the processing system 106 to support or otherwise perform certain tasks, operations, functions, and/or processes described herein.

The display system 108 generally represents the hardware, software, and/or firmware components configured to control the display and/or rendering of one or more navigational maps and/or other displays pertaining to operation of the aircraft 120 and/or onboard systems 110, 112, 114, 116 on the display device 102. In this regard, the display system 108 may access or include one or more databases suitably configured to support operations of the display system 108, such as, for example, a terrain database, an obstacle database, a navigational database, a geopolitical database, a terminal airspace database, a special use airspace database, or other information for rendering and/or displaying navigational maps and/or other content on the display device 102.

In the illustrated embodiment, the aircraft system 100 includes a data storage element 118, which contains aircraft procedure information (or instrument procedure information) for a plurality of airports and maintains association between the aircraft procedure information and the corresponding airports. Depending on the embodiment, the data storage element 118 may be physically realized using RAM memory, ROM memory, flash memory, registers, a hard disk, or another suitable data storage medium known in the art or any suitable combination thereof. As used herein, aircraft procedure information should be understood as a set of operating parameters, constraints, or instructions associated with a particular aircraft action (e.g., approach, departure, arrival, climbing, and the like) that may be undertaken by the aircraft 120 at or in the vicinity of a particular airport. An airport should be understood as referring to any sort of location suitable for landing (or arrival) and/or takeoff (or departure) of an aircraft, such as, for example, airports, runways, landing strips, and other suitable landing and/or departure locations, and an aircraft action should be understood as referring to an approach (or landing), an arrival, a departure (or takeoff), an ascent, taxiing, or another aircraft action having associated aircraft procedure information. An airport may have one or more predefined aircraft procedures associated therewith, wherein the aircraft procedure information for each aircraft procedure at each respective airport are maintained by the data storage element 118 in association with one another.

Depending on the embodiment, the aircraft procedure information may be provided by or otherwise obtained from a governmental or regulatory organization, such as, for example, the Federal Aviation Administration in the United States. In an exemplary embodiment, the aircraft procedure information comprises instrument procedure information, such as instrument approach procedures, standard terminal arrival routes, instrument departure procedures, standard instrument departure routes, obstacle departure procedures, or the like, traditionally displayed on a published charts, such as Instrument Approach Procedure (IAP) charts, Standard Terminal Arrival (STAR) charts or Terminal Arrival Area (TAA) charts, Standard Instrument Departure (SID) routes, Departure Procedures (DP), terminal procedures, approach plates, and the like. In exemplary embodiments, the data storage element 118 maintains associations between prescribed operating parameters, constraints, and the like and respective navigational reference points (e.g., waypoints, positional fixes, radio ground stations (VORs, VORTACs, TACANs, and the like), distance measuring equipment, non-directional beacons, or the like) defining the aircraft procedure, such as, for example, altitude minima or maxima, minimum and/or maximum speed constraints, RTA constraints, and the like. In this regard, although the subject matter may be described in the context of a particular procedure for purpose of explanation, the subject matter is not intended to be limited to use with any particular type of aircraft procedure and may be implemented for other aircraft procedures in an equivalent manner.

Still referring to FIG. 1, in exemplary embodiments, the processing system 106 is coupled to the navigation system 112, which is configured to provide real-time navigational data and/or information regarding operation of the aircraft 120. The navigation system 112 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 112, as will be appreciated in the art. The navigation system 112 is capable of obtaining and/or determining the instantaneous position of the aircraft 120, that is, the current (or instantaneous) location of the aircraft 120 (e.g., the current latitude and longitude) and the current (or instantaneous) altitude or above ground level for the aircraft 120. The navigation system 112 is also capable of obtaining or otherwise determining the heading of the aircraft 120 (i.e., the direction the aircraft is traveling in relative to some reference). In the illustrated embodiment, the processing system 106 is also coupled to the communications system 110, which is configured to support communications to and/or from the aircraft 120. For example, the communications system 110 may support communications between the aircraft 120 and air traffic control or another suitable command center or ground location. In this regard, the communications system 110 may be realized using a radio communication system and/or another suitable data link system.

In exemplary embodiments, the processing system 106 is also coupled to the FMS 114, which is coupled to the navigation system 112, the communications system 110, and one or more additional avionics systems 116 to support navigation, flight planning, and other aircraft control functions in a conventional manner, as well as to provide real-time data and/or information regarding the operational status of the aircraft 120 to the processing system 106. Although FIG. 1 depicts a single avionics system 116, in practice, the system 100 and/or aircraft 120 will likely include numerous avionics systems for obtaining and/or providing real-time flight-related information that may be displayed on the display device 102 or otherwise provided to a user (e.g., a pilot, a co-pilot, or crew member). For example, practical embodiments of the system 100 and/or aircraft 120 will likely include one or more of the following avionics systems suitably configured to support operation of the aircraft 120: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

It should be understood that FIG. 1 is a simplified representation of the system 100 for purposes of explanation and ease of description, and FIG. 1 is not intended to limit the application or scope of the subject matter described herein in any way. It should be appreciated that although FIG. 1 shows the display device 102, the user input device 104, and the processing system 106 as being located onboard the aircraft 120 (e.g., in the cockpit), in practice, one or more of the display device 102, the user input device 104, and/or the processing system 106 may be located outside the aircraft 120 (e.g., on the ground as part of an air traffic control center or another command center) and communicatively coupled to the remaining elements of the system 100 (e.g., via a data link and/or communications system 110). Similarly, in some embodiments, the data storage element 118 may be located outside the aircraft 120 and communicatively coupled to the processing system 106 via a data link and/or communications system 110. Furthermore, practical embodiments of the system 100 and/or aircraft 120 will include numerous other devices and components for providing additional functions and features, as will be appreciated in the art. In this regard, it will be appreciated that although FIG. 1 shows a single display device 102, in practice, additional display devices may be present onboard the aircraft 120. Additionally, it should be noted that in other embodiments, features and/or functionality of processing system 106 described herein can be implemented by or otherwise integrated with the features and/or functionality provided by the FMS 114. In other words, some embodiments may integrate the processing system 106 with the FMS 114. In yet other embodiments, various aspects of the subject matter described herein may be implemented by or at an electronic flight bag (EFB) or similar electronic device that is communicatively coupled to the processing system 106 and/or the FMS 114.

Figure 2:
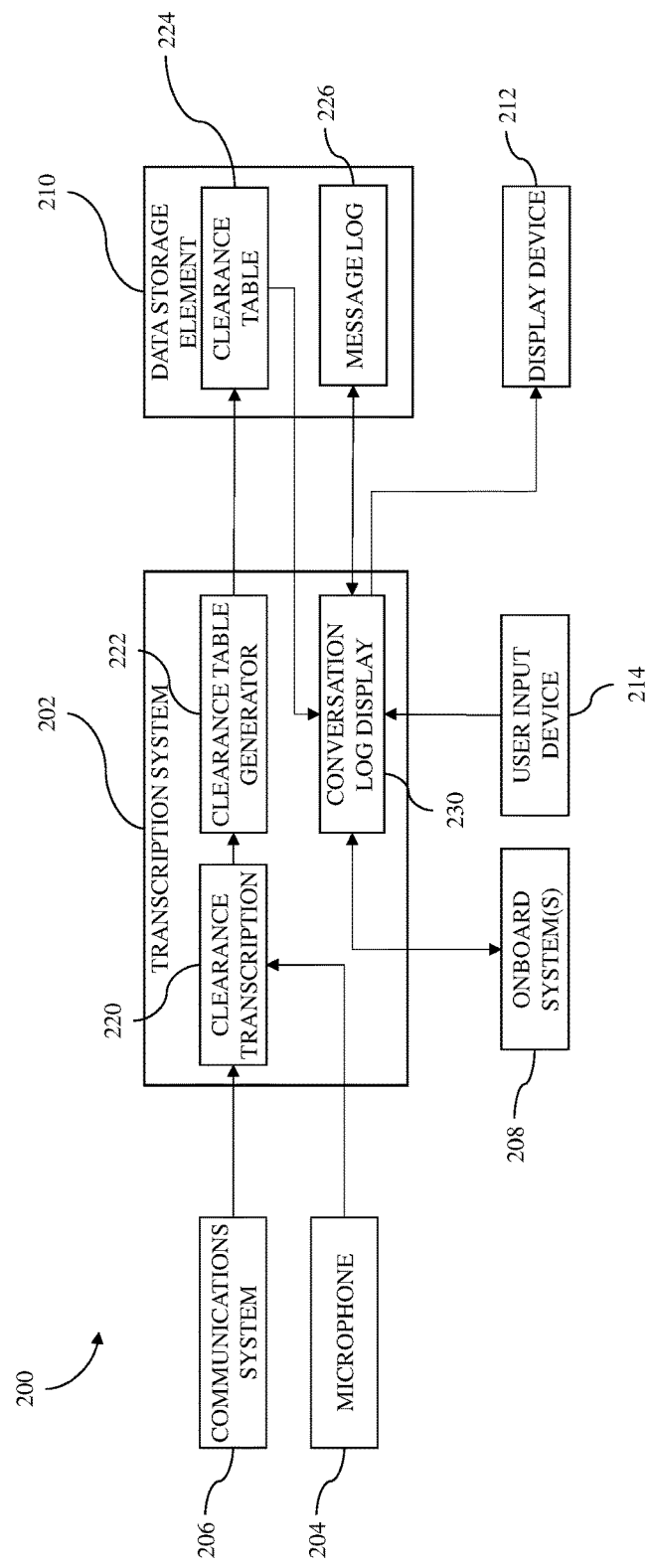
FIG. 2 is a block diagram illustrating a speech recognition system suitable for use with the aircraft system of FIG. 1 in accordance with one or more exemplary embodiments.

FIG. 2 depicts an exemplary embodiment of a speech recognition system 200 for transcribing speech, voice commands or any other received audio communications (e.g., audio broadcasts received from the automatic terminal information service (ATIS)). In one or more exemplary embodiments, the speech recognition system 200 is implemented or otherwise provided onboard a vehicle, such as aircraft 120; however, in alternative embodiments, the speech recognition system 200 may be implemented independent of any aircraft or vehicle, for example, at a ground location such as an air traffic control facility. That said, for purposes of explanation, the speech recognition system 200 may be primarily described herein in the context of an implementation onboard an aircraft. The illustrated speech recognition system 200 includes a transcription system 202, an audio input device 204 (or microphone) and one or more communications systems 206 (e.g., communications system 110). The transcription system 202 is also coupled to one or more onboard systems 208 (e.g., one or more avionics systems 108, 110, 112, 114, 116) to receive data messages for concurrent presentation with transcribed audio communications on a common GUI display on a display device 212 (e.g., display device 102), as described in greater detail below. It should be understood that FIG. 2 is a simplified representation of the speech recognition system 200 for purposes of explanation and ease of description, and FIG. 2 is not intended to limit the application or scope of the subject matter described herein in any way.

The transcription system 202 generally represents the processing system or component of the speech recognition system 200 that is coupled to the microphone 204 and communications system(s) 206 to receive or otherwise obtain audio clearance communications and other audio communications, analyze the audio content of the clearance communications, and transcribe the audio content of the clearance communications, as described in greater detail below. Depending on the embodiment, the transcription system 202 may be implemented as a separate standalone hardware component, while in other embodiments, the features and/or functionality of the transcription system 202 may be integrated with and/or implemented using another processing system (e.g., processing system 106). In this regard, the transcription system 202 may be implemented using any sort of hardware, firmware, circuitry and/or logic components or combination thereof. For example, depending on the embodiment, the transcription system 202 may be realized as a general purpose processor, a content addressable memory, a digital signal processor, an application specific integrated circuit, a field programmable gate array, any suitable programmable logic device, discrete gate or transistor logic, processing core, a combination of computing devices (e.g., a plurality of processing cores, a combination of a digital signal processor and a microprocessor, a plurality of microprocessors, one or more microprocessors in conjunction with a digital signal processor core, or any other such configuration), discrete hardware components, or any combination thereof, designed to perform the functions described herein.

The audio input device 204 generally represents any sort of microphone, audio transducer, audio sensor, or the like capable of receiving voice or speech input. In this regard, in one or more embodiments, the audio input device 204 is realized as a microphone (e.g., user input device 104) onboard the aircraft 120 to receive voice or speech annunciated by a pilot or other crewmember onboard the aircraft 120 inside the cockpit of the aircraft 120. The communications system(s) 206 (e.g., communications system 110) generally represent the avionics systems capable of receiving clearance communications from other external sources, such as, for example, other aircraft, an air traffic controller, or the like. Depending on the embodiment, the communications system(s) 206 could include one or more of a very high frequency (VHF) radio communications system, a controller-pilot data link communications (CPDLC) system, an aeronautical operational control (AOC) communications system, an aircraft communications addressing and reporting system (ACARS), and/or the like.

In exemplary embodiments, computer-executable programming instructions are executed by the processor, control module, or other hardware associated with the transcription system 202 and cause the transcription system 202 to generate, execute, or otherwise implement a clearance transcription application 220 capable of analyzing, parsing, or otherwise processing voice, speech, or other audio input received by the transcription system 202 to convert the received audio content into a corresponding textual representation. In this regard, the clearance transcription application 220 may implement or otherwise support a speech recognition engine (or voice recognition engine) or other speech-to-text system. Accordingly, the transcription system 202 may also include various filters, analog-to-digital converters (ADCs), or the like, and the transcription system 202 may include or otherwise access a data storage element 210 (or memory) that stores a speech recognition vocabulary for use by the clearance transcription application 220 in converting audio inputs into transcribed textual representations. In one or more embodiments, the clearance transcription application 220 may also mark, tag, or otherwise associate a transcribed textual representation of a clearance communication with an identifier or other indicia of the source of the clearance communication (e.g., the onboard microphone 204, a radio communications system 206, or the like).

In exemplary embodiments, the computer-executable programming instructions executed by the transcription system 202 also cause the transcription system 202 to generate, execute, or otherwise implement a clearance table generation application 222 (or clearance table generator) that receives the transcribed textual clearance communications from the clearance transcription application 220 or receives clearance communications in textual form directly from a communications system 206 (e.g., a CPDLC system). The clearance table generator 222 parses or otherwise analyzes the textual representation of the received clearance communications and generates corresponding clearance communication entries in a table 224 in the memory 210. In this regard, the clearance table 224 maintains all of the clearance communications received by the transcription system 202 from either the onboard microphone 204 or an onboard communications system 206.

In exemplary embodiments, for each clearance communication received by the clearance table generator 222, the clearance table generator 222 parses or otherwise analyzes the textual content of the clearance communication using natural language processing and attempts to extract or otherwise identify, if present, one or more of an identifier contained within the clearance communication (e.g., a flight identifier, call sign, or the like), an operational subject of the clearance communication (e.g., a runway, a taxiway, a waypoint, a heading, an altitude, a flight level, or the like), an operational parameter value associated with the operational subject in the clearance communication (e.g., the runway identifier, taxiway identifier, waypoint identifier, heading angle, altitude value, or the like), and/or an action associated with the clearance communication (e.g., landing, takeoff, pushback, hold, or the like). The clearance table generator 222 also identifies the radio frequency or communications channel associated with the clearance communication and attempts to identify or otherwise determine the source of the clearance communication. The clearance table generator 222 then creates or otherwise generates an entry in the clearance table 224 that maintains an association between the textual content of the clearance communication and the identified fields associated with the clearance communication. Additionally, the clearance table generator 222 may analyze the new clearance communication entry relative to existing clearance communication entries in the clearance table 224 to identify or otherwise determine a conversational context to be assigned to the new clearance communication entry (e.g., whether a given communication corresponds to a request, a response, an acknowledgment, and/or the like).

Still referring to FIG. 2, in one or more embodiments, the processor, control module, or other hardware associated with the transcription system 202 executes computer-executable programming instructions that cause the transcription system 202 to generate, execute, or otherwise implement a conversation log display application 230 capable of generating or otherwise providing a conversation log GUI display that includes graphical representations of the transcribed audio communications from the clearance table 224 interspersed with graphical representations of data messages, text messages and/or other messages received via one or more onboard system(s) 208 in a sequential, time-ordered manner. As described in greater detail below in the context of FIGS. 3-5, in one or more embodiments, the conversation log display application 230 creates or otherwise maintains a message log 226 in the data storage element 210 that includes entries corresponding to received messages intended for the ownship aircraft. For example, an entry in the message log 226 maintains an association between the text or other content of a received data message and a timestamp associated with receipt of the message. Additionally, the entry in the message log 226 may maintain an indication of the source of the respective message (e.g., identification of the particular onboard system 208 the message was received from) along with one or more additional fields of metadata characterizing the status of the message (e.g., whether the message is read or unread, accepted or rejected, etc.).

As described in greater detail below in the context of FIGS. 3-5, in one or more embodiments, the conversation log display application 230 generates or otherwise provides one or more buttons or similar selectable GUI elements associated with the graphical representation of a received message that allow a pilot or other user to initiate or otherwise perform an action with respect to the received message via a user input device 214 (e.g., user input device 104). For example, the received message may be a CPDLC text message that includes a clearance instruction or request, which the pilot may be capable of accepting or rejecting via selection of a corresponding button presented on the conversation log GUI display. In response to selection of a selectable GUI element associated with a received message, the conversation log display application 230 dynamically updates the conversation log GUI display by removing the selectable GUI element(s) that were previously depicted in association with the received message and updates the conversation log GUI display to reflect the selected action, for example, by modifying a color or other visually distinguishable graphical characteristic associated with the depiction of the received message to indicate the action, removing the depiction of the received message and/or generating a new confirmation message on the conversation log GUI display that indicates the selected action in a sequential, time-ordered manner according to a timestamp associated with the user selection of the GUI element. The conversation log display application 230 may also update the message log 226 to include one or more fields of metadata indicating the selected action associated with a previously received message and/or the create a new entry for the confirmation message for the selected action to be depicted on the conversation log GUI display.

Still referring to FIG. 2, in one or more exemplary embodiments, the transcription system 202, the data storage element 210, the display device 212 and the user input device 214 are integrated or otherwise implemented at a common electronic device, such as an EFB, a mobile device, a laptop computer, or the like. In this regard, the transcription system 202 may be communicatively coupled to the communications system 206 and/or one or more of the onboard systems 208 via a wireless network. For example, referring to FIGS. 1-2, in one embodiment, the aircraft 120 includes a data gateway device that functions as an intermediary device that supports wireless communications between onboard systems 110, 112, 114, 116, 206, 208 and the transcription system 202 at an EFB or other client electronic device. In such embodiments, the data gateway device may be coupled to onboard systems 110, 112, 114, 116, 206, 208 via one or more avionics buses or another suitable communications medium. Additionally, in such embodiments, received audio communications may be streamed from the gateway device to the EFB without reliance on or utilization of any microphone or other local audio input device associated with the EBB.

Figure 3:
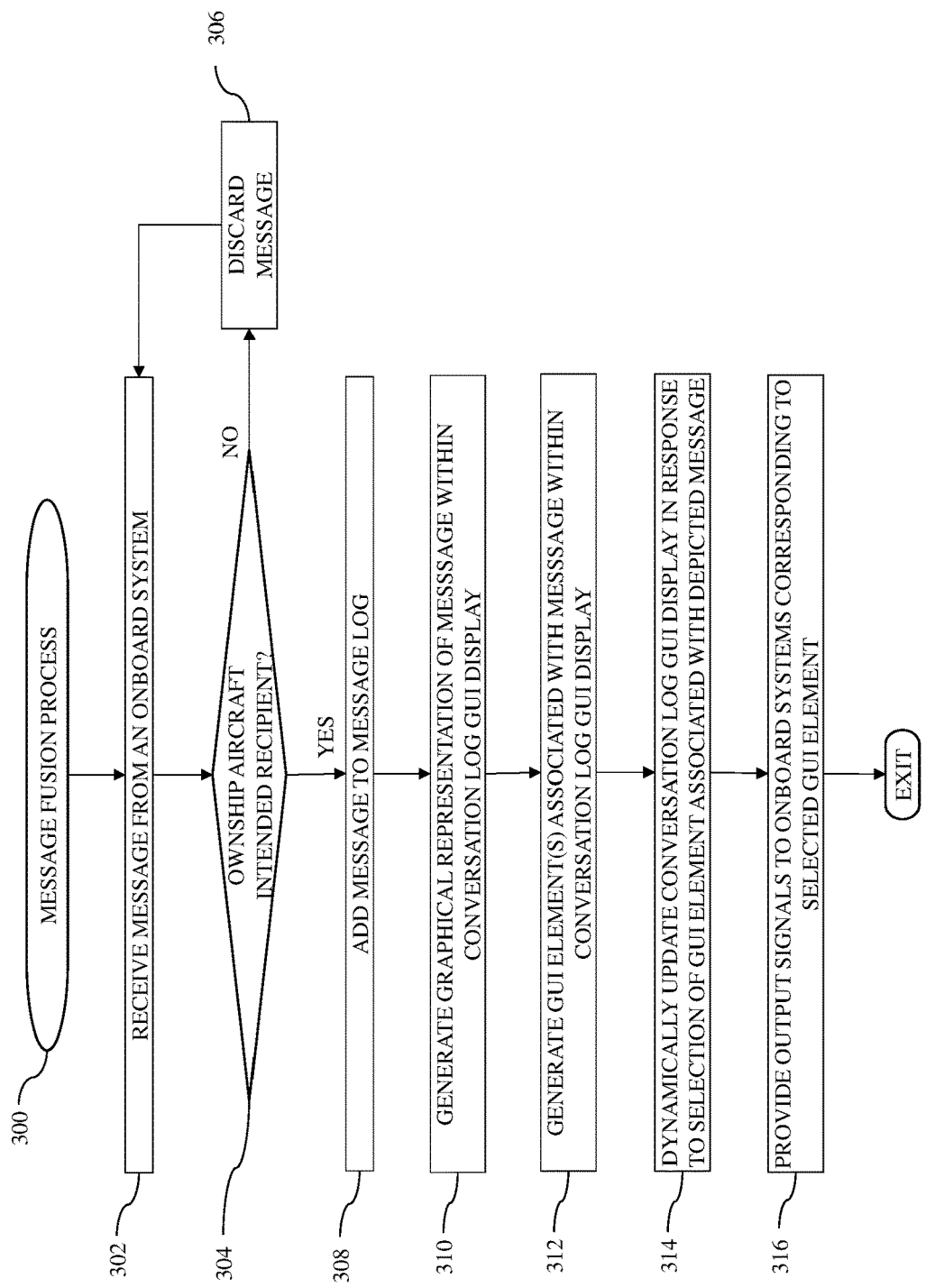
FIG. 3 is a flow diagram of a message fusion process suitable for implementation by the speech recognition system of FIG. 2 in the aircraft system of FIG. 1 in one or more exemplary embodiments.

FIG. 3 depicts an exemplary embodiment of a message fusion process 300 suitable for implementation by an aircraft system to provide a consolidated conversation log GUI display that includes graphical representations of text messages or other data messages interspersed within graphical representations of transcribed audio communications. The various tasks performed in connection with the illustrated process may be implemented using hardware, firmware, software executed by processing circuitry, or any combination thereof. For illustrative purposes, the following description may refer to elements mentioned above in connection with FIGS. 1-2. In practice, portions of the message fusion process 300 may be performed by different elements of the aircraft system 100. That said, exemplary embodiments are described herein in the context of the message fusion process 300 being primarily performed by the conversation log display application 230 at the transcription system 202 and/or the processing system 106. It should be appreciated that the message fusion process 300 may include any number of additional or alternative tasks, the tasks need not be performed in the illustrated order and/or the tasks may be performed concurrently, and/or the message fusion process 300 may be incorporated into a more comprehensive procedure or process having additional functionality not described in detail herein. Moreover, one or more of the tasks shown and described in the context of FIG. 3 could be omitted from a practical embodiment of the message fusion process 300 as long as the intended overall functionality remains intact.

Referring to FIG. 3 with continued reference to FIGS. 1-2, in exemplary embodiments, the message fusion process 300 in connection with presentation of a conversation log GUI display on a display device 102, 212 that includes graphical representations of transcribed ATC clearance communications and/or other received audio communications that are sequentially arranged in a chronological or time-ordered manner. For example, the conversation log GUI display may be configurable to depict graphical representations of the transcribed audio communications corresponding to entries in the clearance table 224 where the ownship aircraft was the sender or intended recipient of the audio communications in a manner that allows a pilot or other user to scroll through the transcribed communications to review individual communications chronologically in the context of the ongoing conversation. In this regard, the conversation log GUI display may depict only a limited subset of the most recent communications based on the available display area allocated to a presentation region of the conversation log GUI display in concert with a scroll bar, slider or similar GUI element that allows the user to view older communications within the presentation region of the conversation log GUI display. The message fusion process 300 integrates other messages received outside of the audio communications into the conversation log GUI display in a chronological manner that reflects the temporal context of the messages with respect to the conversation context, thereby providing a more coherent and comprehensive understanding of the various communications received at or by various different systems onboard the aircraft. Thus, a pilot or other user is alleviated of the manual burden of consulting different systems or components onboard the aircraft to aggregate communications, as well as the mental burden of synthesizing and chronologizing the communications.

In one or more exemplary embodiments, the conversation log GUI display includes a checkbox or similar GUI element configurable to allow a user to manually enable or disable the message fusion process 300 as desired. In parallel to the message fusion process 300, audio communications received via a microphone 104, 204 or a radio or other onboard communications system 110, 206 are continually transcribed by the clearance transcription application 220 and transformed into corresponding entries in the clearance table 224 by the clearance table generator 222. The conversation log display application 230 continually monitors and analyzes the clearance table 224 for new entries having the ownship aircraft as the sender or an intended recipient, and in response to a new entry, the conversation log display application 230 dynamically updates the conversation log GUI display to include a graphical representation of the transcribed audio of the respective communication that is depicted chronologically at a position on the conversation log GUI display relative to other transcribed communications and/or messages that corresponds to a timestamp associated with receipt of the respective audio communication.

Still referring to FIG. 3, when enabled, the message fusion process 300 continually monitors and analyzes one or more onboard systems for received text messages or other data messages (task 302). For example, the conversation log display application 230 may continually monitor an onboard avionics system 116, 208, such as a CPDLC system, an ACARS system, and/or the like. In this regard, in one or more embodiments, the FMS 114 and/or other avionics system(s) 116 onboard the aircraft 120 may be configured to automatically push or otherwise publish received messages to a subscribed system. For example, the FMS 114 may be configured to subscribe to the CPDLC system or other onboard avionics system(s) 116, 208 that are capable of receiving text messages or other data messages intended for the aircraft 120, such that the onboard avionics system(s) 116, 208 automatically push or otherwise provide received messages (or indicia thereof) to the subscribed FMS 114 over an avionics bus, a wireless network, or the like. Similarly, the transcription system 202 and/or the conversation log display application 230 may be subscribed to the FMS 114, so that the FMS 114 automatically pushes or otherwise provides (e.g., over a wireless network) received messages to the transcription system 202 and/or the conversation log display application 230 for processing. In this regard, the transcription system 202 and/or the conversation log display application 230 may communicatively coupled to the FMS 114, 208 via a wireless network or other communications medium that allows the transcription system 202 and/or the conversation log display application 230 to receive messages received at the aircraft 120 indirectly via the FMS 114, 208 rather than directly from onboard avionics systems 116, 208.

In some embodiments, the message fusion process 300 determines, verifies or otherwise confirms that the ownship aircraft is an intended recipient of the message and discards or otherwise ignores the message when the ownship aircraft is not the intended recipient (tasks 304, 306). For example, the conversation log display application 230 may continually monitor an onboard avionics system 116, 208 and analyze received messages to filter or otherwise exclude from further consideration any messages that are not intended for or otherwise relevant to the ownship aircraft.

In response to receiving a message for the ownship aircraft, in exemplary embodiments, the message fusion process 300 generates or otherwise creates an entry in a message log to maintain the content of the message in association with a timestamp (or time of receipt of the message) and generates or otherwise provides a graphical representation of the content of the message within the conversation log GUI display (tasks 308, 310). For example, as described above, the conversation log display application 230 may create an entry in the message log 226 that maintains an association between the textual content and/or other content of the message, the source of the message, and a timestamp associated with receipt of the message. Additionally, the conversation log display application 230 may initialize one or more additional fields of metadata characterizing the status of the message to reflect an initial state of the message (e.g., unread, unacknowledged, etc.). The conversation log display application 230 then generates or otherwise provides a graphical representation of the content of the received message within the conversation log GUI display that is positioned with respect to the depicted audio communications transcriptions chronologically in a manner consistent with the timestamp associated with the message relative to the timestamps associated with the audio communications.

In one or more embodiments, the message fusion process 300 may utilize natural language processing or other artificial intelligence techniques to augment or otherwise modify the textual content of the received message for semantic and/or syntactic purposes. For example, the conversation log display application 230 may filter or otherwise remove aircraft identifiers or other terms to translate the content of a text message from a standard command phraseology (e.g., an international standard of phraseology set forth in the International Civil Aviation Organization (ICAO) Annex 10 Volume II Chapter 5, ICAO Doc 4444 Chapter 12 and in ICAO Doc 9432—Manual of Radiotelephony) into a more conversational form that is syntactically consistent with normal conversation and conveys the intent or objective of the message in a manner that is semantically clear before displaying a graphical representation of the augmented content of the received message. In this regard, a CPDLC message such as "MOONEY 58102 DIRTO AFRIC" may be augmented or otherwise modified to "PROCEED DIRTO AFRIC." It should be noted the augmentation or modification of the textual content is not limited to any particular implementation, and in practice, may be performed using a lookup table configurable to map CPDLC messages or phrases to corresponding conversational messages or any other suitable natural language processing technique, machine learning, AI and/or the like.

Still referring to FIG. 3, in one or more exemplary embodiments, the message fusion process 300 generates or otherwise provides one or more GUI elements associated with the depicted message within the conversation log GUI display (task 312). In this regard, the GUI elements allow the pilot or other user to initiate or otherwise perform one or more actions with respect to the message and thereby change the presentation state of the message. For example, the conversation log display application 230 may provide buttons or similar selectable GUI elements that allow a pilot or other user to acknowledge a message, mark a message as read, delete a message, accept a request contained within the message, reject a request contained within the message, and/or the like.

In response to selection of a GUI element associated with a depicted message, the message fusion process 300 dynamically updates the conversation log GUI display to reflect the action with respect to the depicted message (task 314). For example, the conversation log display application 230 may render the graphical representation of the message using a different color or other visually distinguishable graphical characteristic to visually convey that an action has been initiated or otherwise performed with respect to the depicted message. In this regard, in concert with updating the conversation log GUI display, the conversation log display application 230 may also update one or more fields of metadata associated with the message in the message log 226 to update the status of the message to reflect the action (e.g., read, acknowledged, accepted, rejected, deleted, etc.).

Additionally, in one or more embodiments, message fusion process 300 generates or otherwise provides one or more commands, instructions or other output signals to one or more onboard systems corresponding to the selection of the depicted GUI element associated with the depicted message (task 316). For example, when the depicted message includes a request or instruction issued for the aircraft 120 by ATC or another operator or system and the pilot selects a button associated with the depicted message to accept the request, the conversation log display application 230 may translate the request into corresponding command signals or instructions that are output or otherwise provided to the appropriate destination onboard system(s) 208 for implementing the request or instruction contained within the message. In this manner, selection of a GUI element associated with a depicted message allows the pilot or other user to automatically program the FMS 114, the navigation system 112, the communications system 110, 206 and/or another avionics system 116, 208 onboard the aircraft 120 indirectly via the conversation log GUI display and the conversation log display application 230 rather than manually programming or implementing the request or instruction at the appropriate destination onboard system(s) 110, 112, 114, 116, 208.

Figure 4:
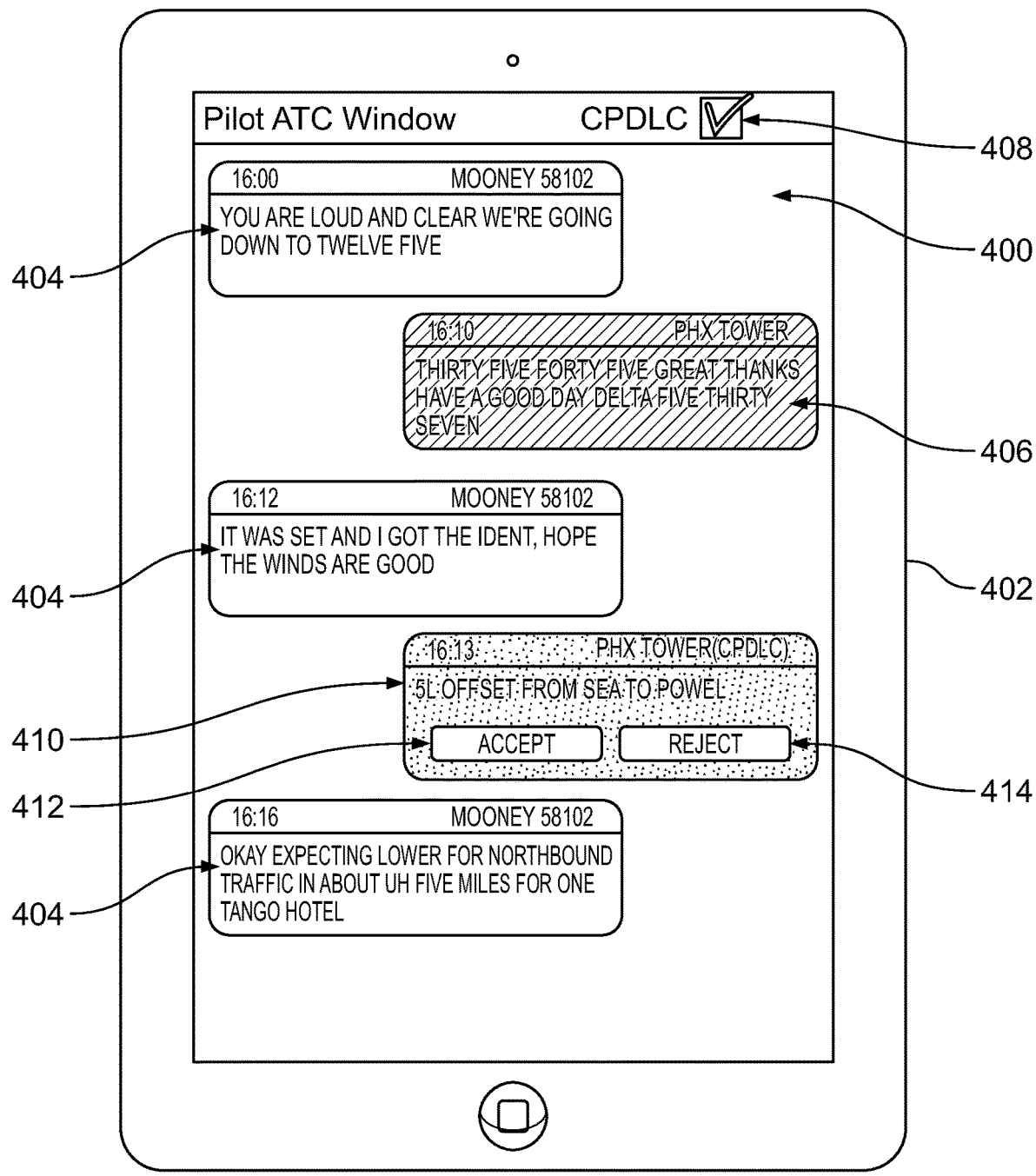
FIGS. 4-5 depict exemplary conversation log graphical user interface (GUI) displays suitable for presentation on a display device in the system of FIG. 1 or FIG. 2 in connection with the message fusion process of FIG. 3 in accordance with one or more embodiments.
Figure 5:
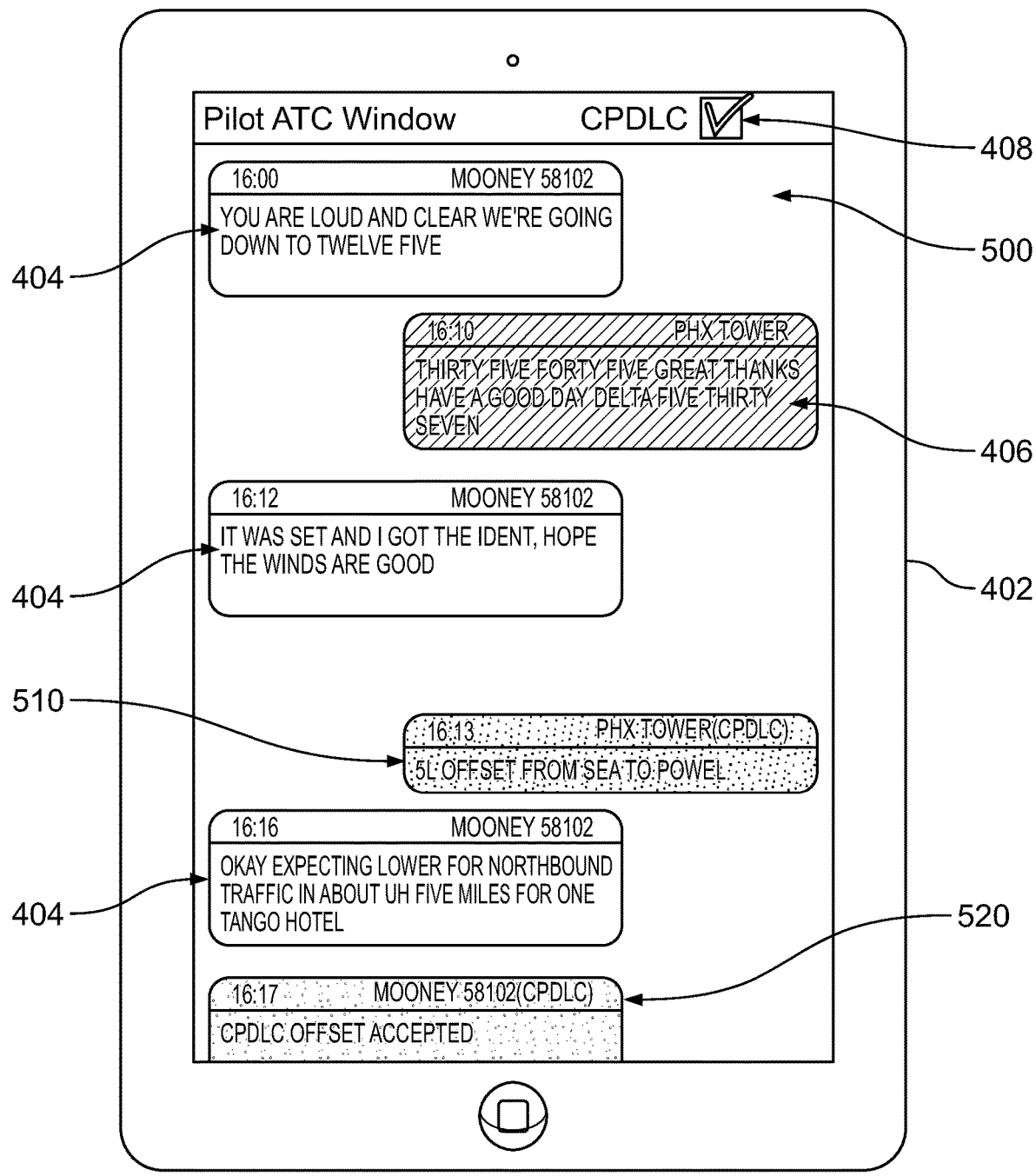

FIGS. 4-5 depict an exemplary sequence of conversation log GUI displays 400, 500 that may be depicted on a display associated with an electronic device 402 in connection with the message fusion process 300 of FIG. 3. In this regard, the electronic device 402 could be realized as any sort of client electronic device, such as, for example, an EFB, a mobile phone, a smartphone, a tablet computer, a laptop computer, and/or the like. In yet other embodiments, the electronic device 402 could be realized as a multi-function control and display unit (MCDU), a display device 102 incorporated to a flight deck of an aircraft 120, or another hardware component of an onboard system 108, 110, 112, 114, 116, 208 that is incorporated with the flight deck or cockpit of the aircraft 120.

The conversation log GUI displays 400, 500 include graphical representations of transcribed audio ATC communications 404, 406 presented in a top-down chronological order, such that more recent audio communications are depicted below preceding audio communications, with the newest or most recent audio communication at or near the bottom of the conversation log GUI display 400, 500 and the oldest or least recent audio communication at or near the top of the conversation log GUI display 400, 500. In this regard, as audio communications are received, the conversation log GUI display 400, 500 effectively scrolls downward to maintain the most recent audio communications displayed within the presentation region (or window) of the conversation log GUI display 400, 500 while graphical representations of older audio communications advance upward out of the presentation region. In this regard, the conversation log GUI display 400, 500 may include a slider or similar GUI element adapted to allow the pilot or other user to adjust the positioning of the presentation region to encompass graphical representations of a particular subset of previously-received audio communications. In some embodiments, the graphical representations 404 of the transcribed audio ATC communications issued by the pilot or other user onboard the ownship aircraft 120 may be rendered at or along a first side or edge of the conversation log GUI display 400, 500 using one or more visually distinguishable graphical characteristics (e.g., color, font, shading and/or the like) to convey the depicted communications 404 are associated with the ownship aircraft 120 as the source of the depicted communications 404, while the graphical representations 406 of the transcribed audio ATC communications issued by the ATC or other external source may be rendered at or along an opposing side or edge of the conversation log GUI display 400, 500 using one or more different visually distinguishable graphical characteristics to convey the depicted communications 406 are associated another source external to the ownship aircraft 120. In this regard, the conversation log GUI display 400, 500 may include text or other indicia of the source of the depicted communications 404, 406 along with the timestamps associated with receipt of the respective communications 404, 406.

Referring to FIG. 4, the conversation log GUI display 400 includes a checkbox 408 (or similar selectable GUI element) that is selectable, manipulable, or otherwise configurable by the pilot or other user to enable the message fusion process 300 to provide a graphical representation 410 of a received data message on the conversation log GUI display 400 interspersed within the depicted ATC communications 404, 406 in a chronological order in accordance with the timestamp associated with the received data message. For example, when the CPDLC system 116, 208 onboard the aircraft 120 receives a message, the onboard CPDLC system 116, 208 may publish or otherwise push the confirmation message to the FMS 114, which, in turn, publishes or otherwise pushes (e.g., over a wireless network) the CPDLC message to the transcription system 202 and/or the conversation log display application 230 that is subscribed to the CPDLC system 116, 208 via the FMS 114. That said, in other embodiments, the transcription system 202 and/or the conversation log display application 230 may receive CPDLC messages directly from the CPDLC system 116, 208 without reliance on an intervening FMS 114 or other intermediary system.

In response to receiving a text message from a CPDLC system including a request or other clearance instruction for the ownship aircraft (e.g., tasks 302, 304), the conversation log display application 230 updates the message log 226 to include an entry corresponding to the CPDLC message and then dynamically updates the conversation log GUI display 400 to include a graphical representation 410 of the received CPDLC message at a vertical position on the conversation log GUI display 410 with respect to depicted ATC communications 404, 406 that reflects the chronological order of the timestamp associated with the received CPDLC message relative to the timestamps associated with the received ATC communications 404, 406 (e.g., tasks 308, 310). For example, as shown, the depicted CPDLC message 410 having a timestamp of 16:13 may be depicted below ATC communications 404, 406 having associated timestamps that precede the time of 16:13 but above any ATC communications 404 having an associated timestamp that follow the time of 16:13. In exemplary embodiments, the graphical representation 410 of the received message is realized as a text box that includes the text or other content of the CPDLC message along with text or other indicia of the source of the depicted message (e.g., PHX TOWER (CPDLC)) and the timestamp associated with the received message. The graphical representation 410 of the received message may also be rendered using one or more different visually distinguishable characteristic(s) to graphically convey that the depicted message 410 is from an external source that is different from the source of the depicted audio communications 404, 406 and/or that the depicted message 410 corresponds to a different type of communication than the depicted audio communications 404, 406.

Still referring to FIG. 4, the graphical representation 410 of the received CPDLC message includes buttons 412, 414 or similar selectable GUI elements that are selectable, manipulable, or otherwise configurable by the pilot or other user to initiate one or more actions with respect to the received CPDLC message (e.g., task 312). For example, in the illustrated embodiment, the graphical representation 410 of the received CPDLC message includes a first button 412 that is selectable by the pilot to accept or acknowledge the request or instruction contained in the CPDLC message and a second button 414 that is selectable by the pilot to reject or deny the request or instruction contained in the CPDLC message.

Referring now to FIG. 5, with continued reference to FIGS. 1-4, the conversation log GUI display 400 is dynamically updated in response to the pilot or other user selecting one of the GUI elements 412, 414 associated with the depicted CPDLC message 410. For example, in response to the pilot selecting the button 412 to accept the request contained within the depicted CPDLC message 410, the conversation log display application 230 may dynamically generate the updated conversation log GUI display 500 in real-time to include an updated graphical representation 510 of the received CPDLC message that no longer includes the buttons 412, 414 (e.g., task 314). The conversation log display application 230 may also update one or more fields of metadata associated with the entry for the message in the message log 226 to update the status or state of the message as accepted, read, and/or the like. In some embodiments, the updated depiction 510 of the CPDLC message may be rendered using one or more visually distinguishable graphical characteristics that are different from the originally-depicted CPDLC message 410 to visually indicate a change in the state associated with the message.

In the illustrated embodiment, the conversation log display application 230 also dynamically updates the conversation log GUI display 400 by generating a graphical representation 520 of a confirmation message corresponding to the action performed responsive to user selection of one of the buttons 412, 414 associated with the originally-depicted CPDLC message 410. For example, the conversation log display application 230 may generate a graphical representation 520 of a confirmation message at or along an opposing edge or side of the updated conversation log GUI display 500 to convey or otherwise indicate the depicted confirmation message 520 corresponds to an action that was initiated or otherwise performed at the ownship aircraft 120 or on behalf of the pilot. In exemplary embodiments, the depicted confirmation message 520 is realized as a text box that includes text that confirms or otherwise indicates the action that was performed with respect to the received CPDLC message, and the depicted confirmation message 520 may be rendered using one or more visually distinguishable graphical characteristics that are different from that of the other depicted communications 404, 406, 510 to indicate a different source and/or different communication type associated with the depicted message 520.

Additionally, the depicted confirmation message 520 may include text or other graphical representation of the timestamp associated with the pilot or user selection of a GUI element 412, 414 associated with initiating performance of an action with respect to the preceding CPDLC message, along with text or other indicia of the source of the depicted confirmation message 520. In this regard, in some embodiments, selection of a GUI element 412, 414 with respect to the previously-depicted message 410 may cause the transcription system 202 and/or the conversation log display application 230 to transmit or otherwise provide one or more commands, signals or instructions indicative of the selected action to an onboard system 208, which, in turn, provides a confirmation message to the transcription system 202 and/or the conversation log display application 230, wherein the conversation log display application 230 dynamically updates the conversation log GUI display in response to the confirmation message from the onboard system 208. For example, in response to user selection of the accept button 412, the transcription system 202 and/or the conversation log display application 230 to transmit or otherwise provide one or more commands, signals or instructions indicative of the pilot accepting the CPDLC request message to a CPDLC system 116, 208 onboard the aircraft 120, which, in turn, transmits or otherwise provides a CPDLC message confirming acceptance to the source of the initial CPDLC request message (e.g., PHX TOWER (CPDLC)). In response to the CPDLC system 116, 208 onboard the aircraft 120 transmitting the confirmation message, the CPDLC system 116, 208 may publish or otherwise push the confirmation message to the FMS 114, which, in turn, publishes or otherwise pushes (e.g., over a wireless network) the confirmation message to the transcription system 202 and/or the conversation log display application 230 that is subscribed to the CPDLC system 116, 208 via the FMS 114.

In one or more embodiments, selection of a button 412 to accept or acknowledge the instructions or other request embodied by a displayed message 410 results in the transcription system 202 and/or the conversation log display application 230 transforming the content of the displayed message 410 into one or more corresponding commands or instructions and then transmitting or otherwise providing one or more output signals indicative of the corresponding command(s) or instruction(s) to the appropriate destination onboard system(s) 208 for performing or otherwise implementing the content of the displayed message 410 (e.g., task 316). For example, the transcription system 202 and/or the conversation log display application 230 may generate corresponding commands or signals for implementing the CPDLC-instructed offset clearance contained in the depicted message 410, 510 to the FMS 114 or another flight control or flight guidance system 116, 208 to facilitate the aircraft 120 executing or otherwise adhering to the CPDLC-instructed offset clearance contained in the depicted message 410, 510. Thus, the pilot does not need to divert attention to the CPDLC system, the FMS and/or other onboard systems and may maintain focus or engagement with respect to the ATC audio communications. By reducing pilot workload, situational awareness with respect to the ATC audio communications and operating the aircraft 120 may be improved.

By consolidating transcriptions of ATC clearance communications between pilots and ATC with concurrent communications or messages between other systems, a pilot or other user is provided with an intuitive and comprehensive view of communications with respect to an aircraft. In this regard, the conversation log GUI display provides a complete summary of the conversation between the pilot and ATC while also displaying CPDLC messages and other communications from different sources in a chronological manner, thereby allowing the pilot to brief the aggregated communications at one device or location, reducing pilot workload and head-down time and improving situational awareness.

For the sake of brevity, conventional techniques related to user interfaces, speech recognition, avionics systems, datalink systems, messaging systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of assisting operation of a vehicle, the method comprising:
   obtaining a transcription of an audio communication with respect to the vehicle;
   generating a conversation log graphical user interface (GUI) display comprising a first graphical representation of the transcription of the audio communication;
   receiving a data message from an onboard system associated with the vehicle;
   generating a second graphical representation of the data message within the conversation log GUI display, wherein:
      the second graphical representation of the data message comprises a selectable element associated with the data message;
      the second graphical representation of the data message and the first graphical representation of the transcription of the audio communication are concurrently displayed on the conversation log GUI display; and
      the second graphical representation of the data message is positioned with respect to the first graphical representation of the transcription of the audio communication in accordance with a timestamp associated with the data message; and
   dynamically updating the conversation log GUI display in response to selection of the selectable element.

2. The method of claim 1, wherein:
   the vehicle comprises an aircraft;
   receiving the data message comprises receiving a text message from an avionics system onboard the aircraft; and
   the second graphical representation of the data message comprises indication of the avionics system associated with the text message.

3. The method of claim 1, further comprising identifying a source of the data message, wherein the second graphical representation of the data message comprises indication of the source of the data message.

4. The method of claim 3, wherein:
   the vehicle comprises an aircraft;
   receiving the data message comprises receiving a datalink message from a controller-pilot datalink communications (CPDLC) system onboard the aircraft;
   the second graphical representation of the data message comprises a graphical representation of the datalink message; and
   the indication of the source comprises an indication of the CPDLC system associated with the datalink message.

5. The method of claim 1, wherein dynamically updating the conversation log GUI display comprises removing the selectable element from the conversation log GUI display in response to selection of the selectable element.

6. The method of claim 1, wherein dynamically updating the conversation log GUI display comprises dynamically updating the second graphical representation of the data message to provide an indication of an action associated with the selectable element in response to selection of the selectable element.

7. The method of claim 1, wherein dynamically updating the conversation log GUI display comprises generating a third graphical representation of a second message within the conversation log GUI display, wherein the third graphical representation of the second message comprises an indication of an action associated with the selectable element.

8. The method of claim 1, further comprising:
   generating an entry associated with the data message in a message log; and
   updating a field associated with the entry in the message log to indicate an action associated with the selectable element in response to selection of the selectable element.

9. The method of claim 1, further comprising providing an output signal indicative of an action associated with the selectable element to a second system onboard the vehicle in response to selection of the selectable element.

10. The method of claim 9, wherein:
    the vehicle comprises an aircraft;
    receiving the data message comprises receiving a datalink message comprising a request from a controller-pilot datalink communications (CPDLC) system onboard the aircraft;
    the second graphical representation of the data message comprises a graphical representation of the datalink message; and
    providing the output signal comprises instructing an avionics system onboard the aircraft to implement the request in response to selection of the selectable element associated with acceptance of the request.

11. The method of claim 1, wherein generating the second graphical representation comprises:

translating the data message from a standard phraseology into a conversational form, resulting in an augmented message; and
generating the second graphical representation of the augmented message.

12. The method of claim 1, wherein:
obtaining the transcription comprises obtaining transcribed text of the audio communication from an entry in a clearance table; and
the first graphical representation of the transcription comprises the transcribed text of the audio communication.

13. The method of claim 1, wherein:
the vehicle comprises an aircraft;
a flight management system (FMS) onboard the aircraft is configured to receive the data message from an avionics system onboard the aircraft vehicle; and
receiving the data message comprises receiving, at an electronic device, the data message from the FMS over a wireless network.

14. The method of claim 13, wherein the data message comprises a datalink message from a controller-pilot datalink communications (CPDLC) system onboard the aircraft.

15. A computer-readable medium having computer-executable instructions stored thereon that, when executed by a processing system, cause the processing system to:
obtain a transcription of an audio communication with respect to a vehicle;
generate a conversation log graphical user interface (GUI) display comprising a first graphical representation of the transcription of the audio communication;
receive a data message from an onboard system onboard associated with the vehicle;
generate a second graphical representation of the data message within the conversation log GUI display, wherein:
the second graphical representation of the data message comprises a selectable element associated with the data message;
the second graphical representation of the data message and the first graphical representation of the transcription of the audio communication are concurrently displayed on the conversation log GUI display; and
the second graphical representation of the data message is positioned with respect to the first graphical representation of the transcription of the audio communication in accordance with a timestamp associated with the data message; and
dynamically update the conversation log GUI display in response to selection of the selectable element.

16. The computer-readable medium of claim 15, wherein the computer-executable instructions cause the processing system to generate an entry associated with the data message in a message log and update a field associated with the entry in the message log to indicate an action associated with the selectable element in response to selection of the selectable element.

17. The computer-readable medium of claim 15, wherein the computer-executable instructions cause the processing system to provide an output signal indicative of an action associated with the selectable element to a second system onboard the vehicle in response to selection of the selectable element.

18. The computer-readable medium of claim 15, wherein the data message comprises a datalink message from a controller-pilot datalink communications (CPDLC) system onboard an aircraft.

19. The computer-readable medium of claim 18, wherein the computer-executable instructions cause the processing system to receive the datalink message from a flight management system (FMS) onboard the aircraft over a wireless network.

20. A system comprising:
a display device;
a data storage element to maintain a transcription of an audio communication with respect to a vehicle; and
a processing system coupled to the display device and the data storage element to:
generate, on the display device, a conversation log graphical user interface (GUI) display comprising a first graphical representation of the transcription of the audio communication;
receive a data message from an onboard system associated with the vehicle;
generate a second graphical representation of the data message within the conversation log GUI display, the second graphical representation of the data message comprising a selectable graphical user interface element associated with the data message; and
dynamically update the conversation log GUI display in response to selection of the selectable graphical user interface element associated with the data message, wherein:
the second graphical representation of the data message and the first graphical representation of the transcription of the audio communication are concurrently displayed on the conversation log GUI display; and
the second graphical representation of the data message is positioned with respect to the first graphical representation of the transcription of the audio communication in accordance with a timestamp associated with the data message.

* * * * *

UNITED STATES PATENT AND TRADEMARK OFFICE
CERTIFICATE OF CORRECTION

PATENT NO. : 11,955,012 B2
APPLICATION NO. : 17/459675
DATED : April 9, 2024
INVENTOR(S) : Gobinathan Baladhandapani et al.

Page 1 of 1

It is certified that error appears in the above-identified patent and that said Letters Patent is hereby corrected as shown below:

In the Claims

Column 21, Line 16 (Claim 13), delete "vehicle"

Column 21, Line 31 (Claim 15), after "system", delete "onboard"

Signed and Sealed this
Twenty-first Day of January, 2025

Coke Morgan Stewart
*Acting Director of the United States Patent and Trademark Office*